(12) United States Patent
Song

(10) Patent No.: US 11,981,219 B2
(45) Date of Patent: May 14, 2024

(54) BATTERY CHARGING SYSTEM AND BATTERY CHARGING METHOD

(71) Applicant: LG CHEM, LTD., Seoul (KR)

(72) Inventor: Hyeon Jin Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 565 days.

(21) Appl. No.: 17/280,578

(22) PCT Filed: Dec. 17, 2019

(86) PCT No.: PCT/KR2019/017908
§ 371 (c)(1),
(2) Date: Mar. 26, 2021

(87) PCT Pub. No.: WO2020/149537
PCT Pub. Date: Jul. 23, 2020

(65) Prior Publication Data
US 2022/0001755 A1 Jan. 6, 2022

(30) Foreign Application Priority Data
Jan. 15, 2019 (KR) .................... 10-2019-0005245

(51) Int. Cl.
*B60L 53/12* (2019.01)
*B60L 58/10* (2019.01)
(Continued)

(52) U.S. Cl.
CPC ............... *B60L 53/12* (2019.02); *B60L 58/10* (2019.02); *B60L 58/22* (2019.02);
(Continued)

(58) Field of Classification Search
USPC ........................................................ 320/104
See application file for complete search history.

(56) References Cited

U.S. PATENT DOCUMENTS 9,231,420 B2 1/2016 Jo et al.
2007/0257642 A1 11/2007 Xiao et al.
(Continued)

FOREIGN PATENT DOCUMENTS

CN 106891765 A * 6/2017 .............. B60L 53/14
CN 109066917 A 12/2018
(Continued)

OTHER PUBLICATIONS

Extended European Search Report dated Oct. 5, 2021 of the corresponding European Patent Application No. 19910649.3.
(Continued)

*Primary Examiner* — Mohammed Alam
(74) *Attorney, Agent, or Firm* — Birch, Stewart, Kolasch & Birch, LLP

(57) ABSTRACT

A battery charging system including a first battery pack having a first battery that is charged in a non-contact connection; a second battery pack having a second battery that is charged in a non-contact connection, a first capacitor connected in series between positive and negative poles of the second battery, and a first BMS configured to measure a voltage of the second battery and voltages of both ends of the first capacitor; and the first BMS charges the second battery with the voltage of the first battery when the first battery voltage is higher than the second battery voltage, and charges the first battery with the voltage of the second battery when the first battery voltage is lower than the second battery voltage.

17 Claims, 6 Drawing Sheets

(51) Int. Cl.
*B60L 58/22* (2019.01)
*H02J 7/00* (2006.01)
*H02J 50/10* (2016.01)

(52) U.S. Cl.
CPC ........ *H02J 7/00045* (2020.01); *H02J 7/0019* (2013.01); *H02J 7/0047* (2013.01); *H02J 50/10* (2016.02)

(56) References Cited

U.S. PATENT DOCUMENTS

| | | |
|---|---|---|
| 2009/0134700 A1 | 5/2009 | Tanaka et al. |
| 2012/0001589 A1 | 1/2012 | Yeh |
| 2013/0119932 A1 | 5/2013 | Moon et al. |
| 2015/0298571 A1 | 10/2015 | Kim et al. |
| 2015/0303712 A1 | 10/2015 | Cabelka et al. |
| 2015/0321578 A1 | 11/2015 | Gorka et al. |
| 2018/0241435 A1 | 8/2018 | Kurz |
| 2020/0222703 A1* | 7/2020 | Perryman ............... H02J 7/02 |
| 2022/0001755 A1* | 1/2022 | Song ................. B60L 53/122 |

FOREIGN PATENT DOCUMENTS

| | | | | |
|---|---|---|---|---|
| EP | 1 112 896 A1 | 4/2001 | | |
| EP | 2 062 801 A1 | 5/2009 | | |
| JP | 7-322515 A | 12/1995 | | |
| JP | 2006-280173 A | 10/2006 | | |
| JP | 2009-131057 A | 6/2009 | | |
| JP | 2010-28918 A | 2/2010 | | |
| JP | 3169938 U | 8/2011 | | |
| JP | 2014-3835 A | 1/2014 | | |
| JP | 5698347 B2 | 4/2015 | | |
| JP | 5929703 B2 | 6/2016 | | |
| JP | 2016-123149 A | 7/2016 | | |
| JP | 2017-11875 A | 1/2017 | | |
| JP | 2017-517360 A | 6/2017 | | |
| KR | 20110075365 A | * | 12/2009 | .......... H02J 7/00302 |
| KR | 10-2015-0121639 A | 10/2015 | | |
| KR | 10-2015-0142215 A | 12/2015 | | |

OTHER PUBLICATIONS

International Search Report for PCT/KR2019/017908 dated Apr. 7, 2020.

* cited by examiner

BATTERY CHARGING SYSTEM AND BATTERY CHARGING METHOD

CROSS-REFERENCE TO RELATED APPLICATION(S)

This application is the National Phase of PCT International Application No. PCT/KR2019/017908, filed on Dec. 17, 2019, which claims priority under 35 U.S.C. 119(a) to Patent Application No. 10-2019-0005245, filed in Republic of Korea on Jan. 15, 2019, all of which are hereby expressly incorporated by reference into the present application.

TECHNICAL FIELD

Background Art

(a) Field of the Invention

The present invention relates to a battery charging system and a battery charging method.

(b) Description of the Related Art

An electric vehicle (EV) is a vehicle that is mainly driven by an AC or DC motor using battery power to obtain power, and researches have been actively conducted thereon in that it is an alternative to solving pollution and energy problems of an internal combustion vehicle. Such electric vehicles are classified into a battery-only electric vehicle and a hybrid electric vehicle, and the battery-only electric vehicle may be driven by driving a motor using battery power, while the hybrid electric vehicle can operate an engine to generate electricity to charge a battery with the electricity, and use this electricity to drive an electric motor, thereby being driven.

Conventionally, an additional battery may be included in such an electric vehicle, or an auxiliary battery may be included in a trailer behind the electric vehicle. However, since charging and discharging operations of the auxiliary battery continue, a voltage difference between a main battery and the auxiliary battery occurs. Therefore, a physical connector is used to minimize the voltage difference, but there is a problem that the life of the connector is shortened due to wear.

DISCLOSURE

Technical Problem

The present invention is to overcome the above problem, and to provide a battery charging system and a battery charging method that may minimize a voltage difference between a main battery and an auxiliary battery.

In addition, the present invention is to provide a battery charging system that may omit a physical connection member between a main battery and an auxiliary battery.

The technical objects of the present invention are not limited to the above, and other non-mentioned objects will be clearly understood by a person of ordinary skill in the art by way of the following description.

Technical Solution

An embodiment provides a battery charging system, including: a first battery pack; and a second battery pack, wherein the first battery pack includes: a first battery; the second battery pack may include a second battery, a first capacitor connected in series between a positive electrode and a negative electrode of the second battery, and a first battery management system (BMS) configured to measure a voltage of the second battery and voltages of both ends of the first capacitor; the first BMS is configured to calculate a voltage of the second battery by using the voltages of both ends of the first capacitor, compare the voltage of the first battery with the voltage of the second battery, when the voltage of the first battery is higher than the voltage of the second battery, charge the second battery with the voltage of the first battery, and when the voltage of the first battery is lower than the voltage of the second battery, charge the first battery with the voltage of the second battery; and the first battery pack and the second battery pack are charged by a non-contact connection.

In addition, in the battery charging system according to the embodiment, the first battery pack further includes a first switch and a first coil connected in series between a positive electrode and a negative electrode of the first battery, and a second BMS configured to control the first switch to a first state or a second state; the second battery pack further includes a second coil connected in series between the positive electrode and the negative electrode of the second battery; and the first coil is a primary coil for wireless power transmission between the first battery and the second battery, while the second coil is a secondary coil for the wireless power transmission between the first battery and the second battery.

In addition, in the battery charging system according to the embodiment, a current of the first battery flows through the first coil in the first state of the first switch, and a current corresponding to counter electromotive force of the first battery voltage flows through the second coil in the second state of the first switch.

In addition, in the battery charging system according to the embodiment, the first capacitor is charged with the voltage of the second battery voltage in the first state of the first switch, and the first capacitor is charged with a voltage corresponding to a sum of the voltage of the first battery and the voltage of the second battery in the second state of the first switch.

In addition, in the battery charging system according to the embodiment, the second battery pack further includes: a first diode connected in parallel to the first capacitor; and a second switch connected between the negative electrode of the second battery and the second coil.

In addition, in the battery charging system according to the embodiment, the first battery pack further includes a second capacitor, a third coil, and a third switch that are connected in series to each other between the positive electrode and the negative electrode of the first battery; the second battery pack further includes a fourth coil and a fourth switch that are connected in series to and between the positive electrode and the negative electrode of the second battery and the first BMS is configured to control the fourth switch to a first state or a second state.

In addition, in the battery charging system according to the embodiment, when the voltage of the first battery voltage is lower than the of the second battery, a current of the second battery flows through the fourth coil in the first state of the fourth switch, and a current corresponding to a counter electromotive force of the voltage of the second battery flows through the third coil in the second state of the fourth switch.

In addition, in the battery charging system according to the embodiment, the second capacitor is charged with the second battery voltage in the first state of the fourth switch, and the second capacitor is charged with a voltage corresponding to a sum of the voltage of the first battery and the voltage of the second battery in the second state of the fourth switch.

In addition, in the battery charging system according to the embodiment, the first battery pack further includes a second diode connected in parallel to the second capacitor.

In addition, in the battery charging system according to the embodiment, the first battery pack further includes a first communication module having a unique ID, the second battery pack further includes a second communication module wireless-communicating with the first communication module and having a unique ID, and when the first battery pack and the second battery pack are connected in the non-contact connection, the first communication module and the second communication module respectively transmit and receive the unique IDs to generate a matching signal when the unique IDs match each other.

In addition, in the battery charging system according to the embodiment, the first BMS controls the second switch according to the matching signal, and the second BMS controls the fourth switch according to the matching signal.

Another embodiment provides a battery charging method, including: a first battery pack; and a second battery pack, wherein the first battery pack includes a first battery, a first switch connected between a positive electrode and a negative electrode of the first battery, a first coil connected in series between positive and negative electrodes of the first battery, and a first communication module including a unique ID; and the second battery pack includes a second battery, a first capacitor connected in series between positive and negative electrodes of the second battery, and a second communication module wireless-communicating with the first communication module and having a unique ID; and generating a matching signal when the first communication module and the second communication module; the first battery pack and the second battery pack are connected by a non-contact connection, and the method comprising the steps of:

generating a matching signal when the first communication module and the second communication module respectively transmit and receive the unique IDs and the unique IDs match each other; controlling the first switch according to the matching signal; measuring a voltage of the second battery; calculating a sum of a voltage of the first battery and the voltage of the second battery by using voltages of both ends of the first capacitor; calculating a voltage of the first battery by using the sum of the voltage of the first battery and the voltage of the second battery; and comparing the voltage of the first battery with the voltage of the second battery, and when the voltage of the first battery is higher than the voltage of the second battery, controlling a switching operation of the first switch a reference number of times.

In addition, in the battery charging method according to the embodiment, the second battery pack further includes a second coil; a first diode connected in parallel to the first capacitor and a second switch connected between a negative electrode of the second battery and the second coil; and a third switch connected between a positive electrode and a negative electrode of the second battery; the first battery pack further includes a third coil; a fourth switch connected between the negative electrode of the first battery and the third coil, a second capacitor connected between the positive electrode and the negative electrode of the first battery, a second diode connected in parallel to the second capacitor, and the controlling of the first switch according to the matching signal includes controlling the first switch to a first state, and controlling the first switch to a second state.

In addition, the battery charging method further includes, after the controlling of the first switch to the first state, controlling the third switch to the second state; and controlling the fourth switch to the second state.

In addition, in the battery charging method according to the embodiment, the calculating of the sum of the voltage of the first battery and the voltage of the second battery includes using the voltages of both ends the first capacitor after the controlling of the first switch to the second state.

In addition, in the battery charging method according to the embodiment, the calculating of the voltage of the first battery by using the sum of the voltage of the first battery and the voltage of the second battery includes calculating the voltage of the first battery by using the sum of the voltage of the first battery and the voltage of the second battery after the controlling of the first switch to the second state.

In addition, the battery charging method further includes comparing the voltage of the first battery with the voltage of the second battery, and when the voltage of the second battery is higher than the voltage of the first battery, charging the first battery with the second battery.

Advantageous Effects

According to the battery charging system and the battery charging method of the present invention, it is possible to minimize a voltage difference between a main battery and an auxiliary battery.

In addition, it is possible to omit a physical connection member between a main battery and an auxiliary battery.

MODE FOR INVENTION

Figure 1:
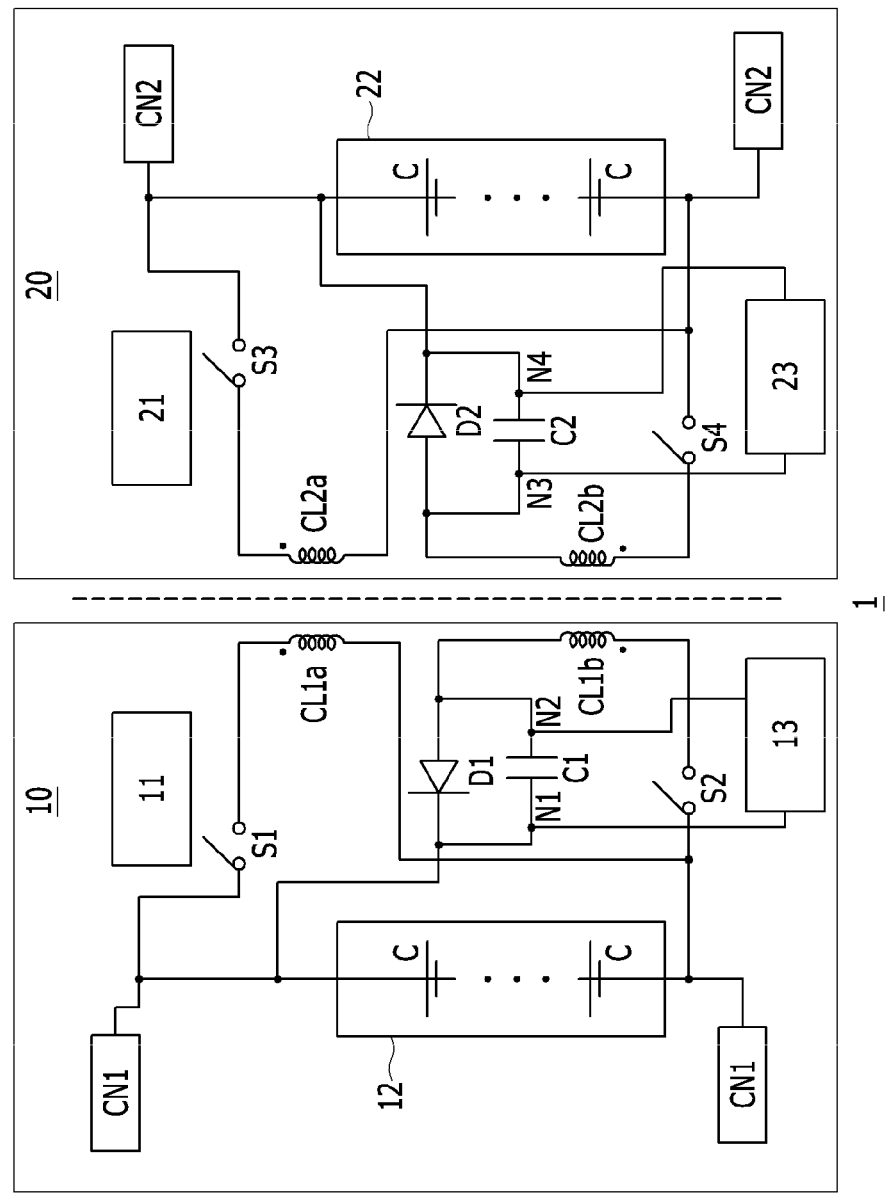
FIG. 1 illustrates a block diagram of a configuration of a battery charging system according to an embodiment.

Hereinafter, exemplary embodiments disclosed in the present specification will be described in detail with reference to the accompanying drawings. In the present specification, the same or similar constituent elements will be denoted by the same or similar reference numerals, and an overlapped description thereof will be omitted. The terms "module" and "unit" representing constituent elements used in the following description are used only in order to make understanding of the specification easier. Therefore, these terms do not have meanings or roles that distinguish them from each other by themselves. In addition, in describing exemplary embodiments of the present specification, when it is determined that a detailed description of the well-known art associated with the present invention may obscure the gist of the present invention, it will be omitted. Further, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various constituent elements, and are not to be interpreted as limiting these constituent elements. The terms are only used to differentiate one constituent element from other constituent elements.

Singular forms are intended to include plural forms unless the context clearly indicates otherwise.

It will be further understood that terms "comprises" or "have" used in the present specification specify the presence of stated features, numerals, steps, operations, constituent elements, parts, or a combination thereof, but do not preclude the presence or addition of one or more other features, numerals, steps, operations, constituent elements, parts, or a combination thereof.

Hereinafter, a battery charging system according to an embodiment will be described with reference to FIG. 1 to FIG. 3.

FIG. 1 illustrates a block diagram of a configuration of a battery charging system according to an embodiment.

Figure 2A:
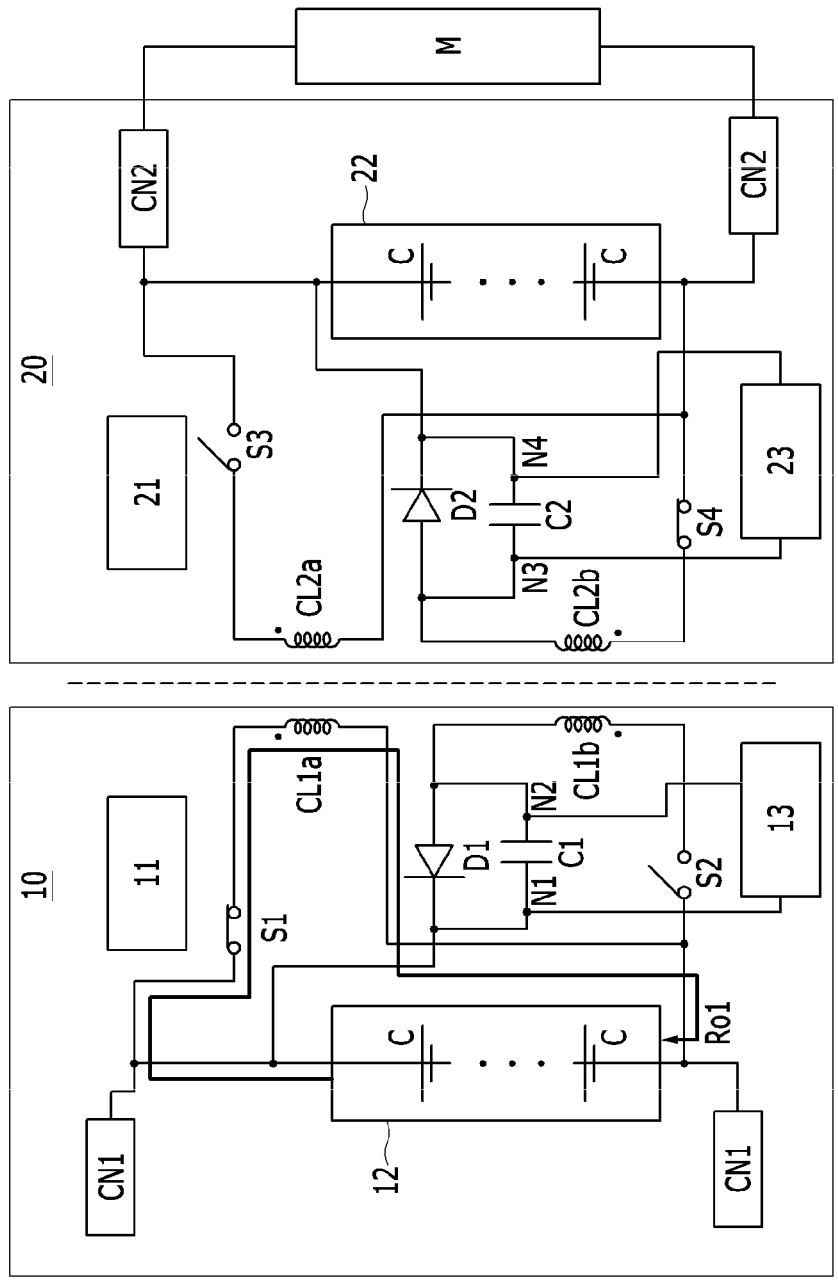
FIG. 2A illustrates a first path of a battery charging system according to an embodiment.

FIG. 2A illustrates a first path of a battery charging system according to an embodiment.

Figure 2B:
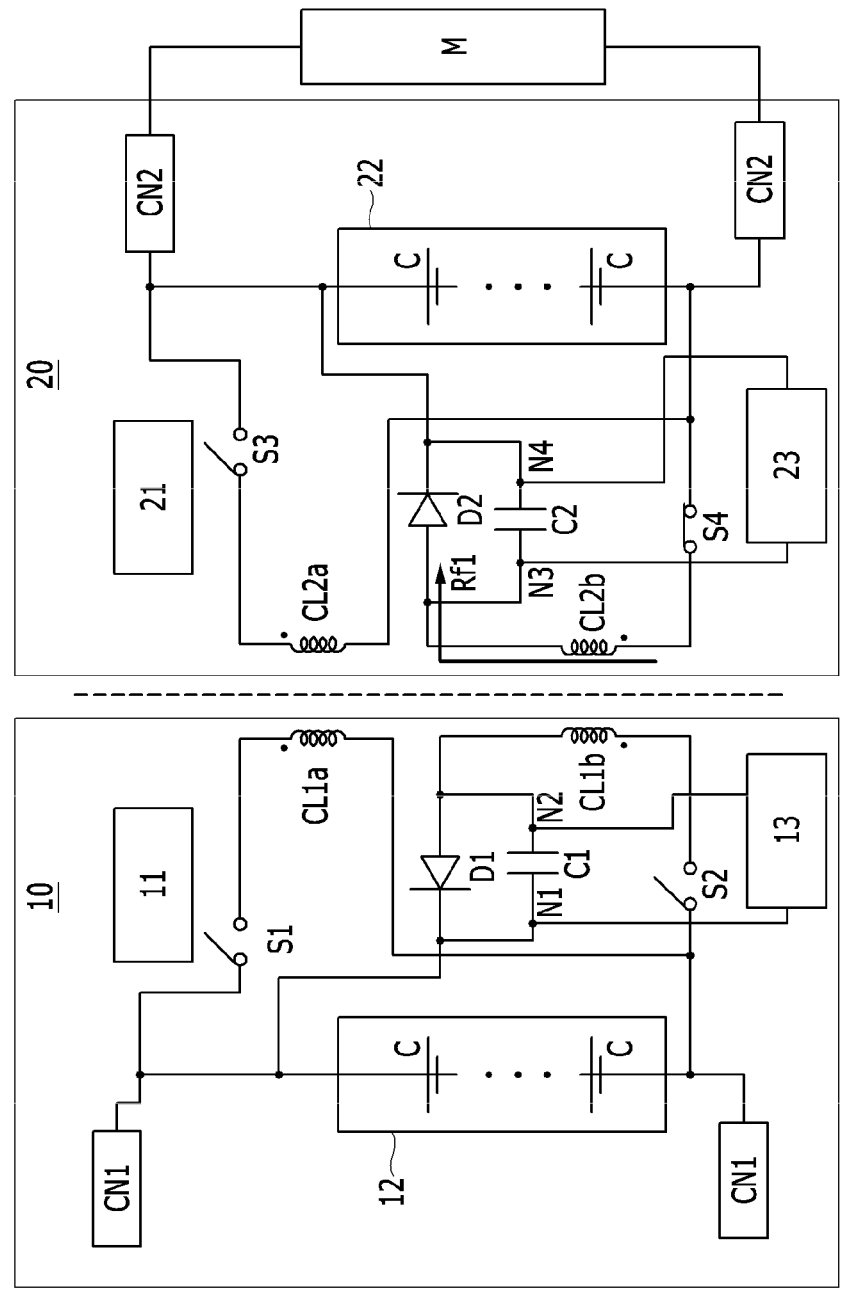
FIG. 2B illustrates a second path of a battery charging system according to an embodiment.

FIG. 2B illustrates a second path of a battery charging system according to an embodiment.

Figure 3A:
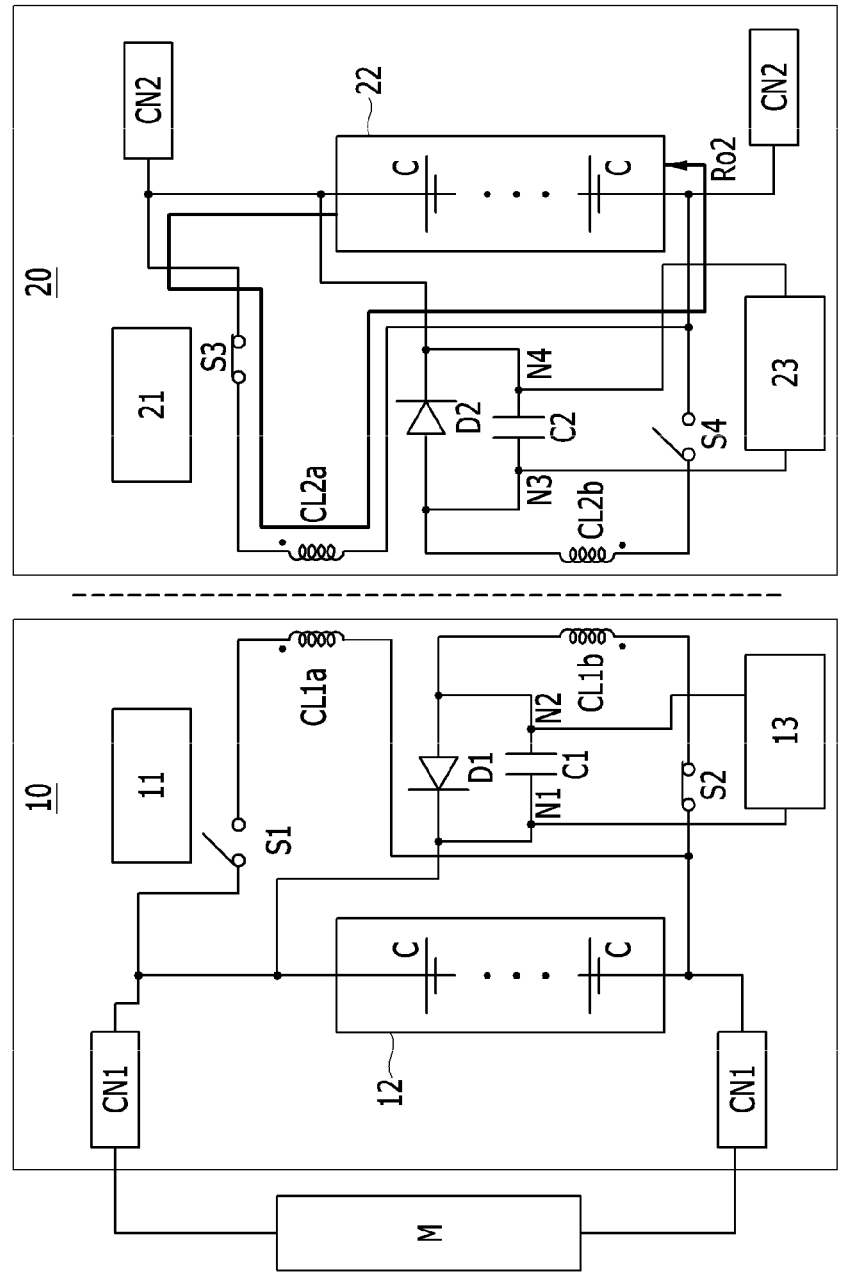
FIG. 3A illustrates a third path of a battery charging system according to an embodiment.

FIG. 3A illustrates a third path of a battery charging system according to an embodiment.

Figure 3B:
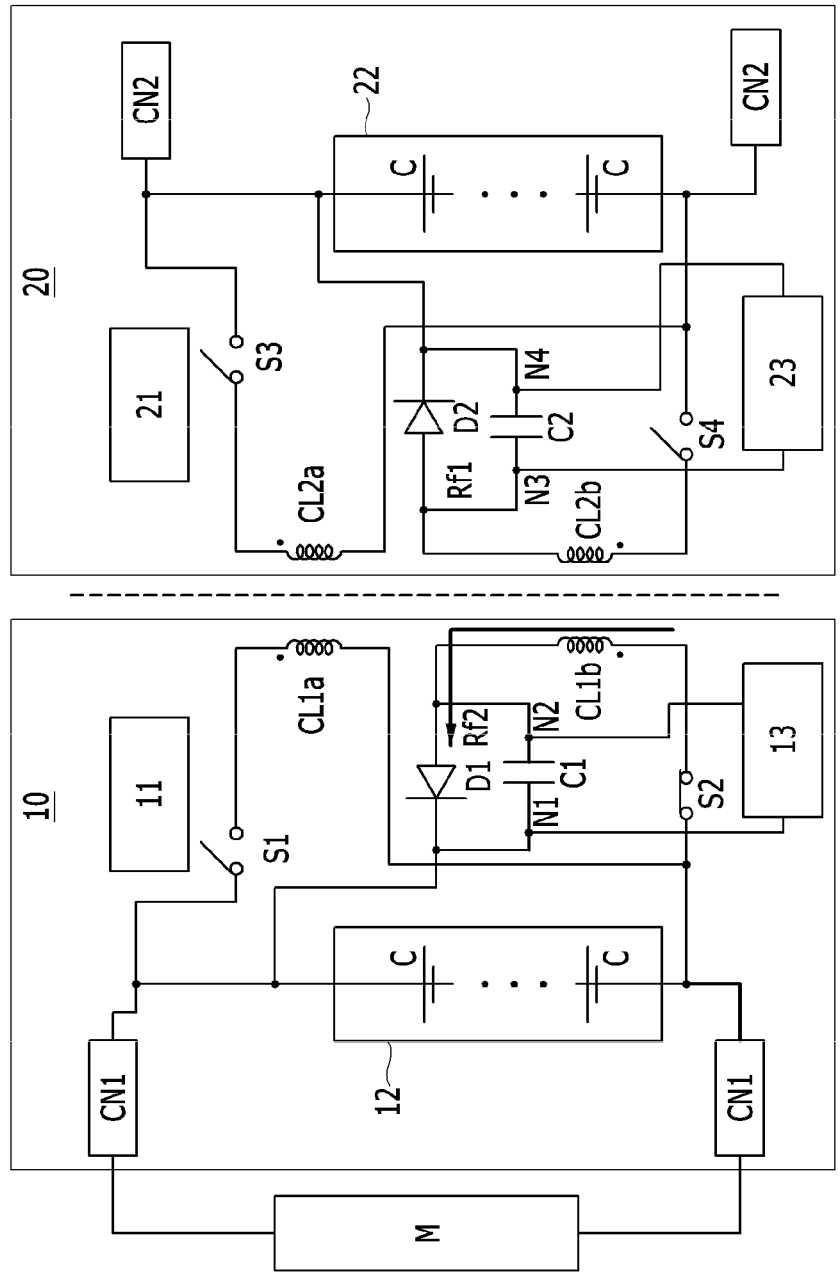
FIG. 3B illustrates a fourth path of a battery charging system according to an embodiment.

FIG. 3B illustrates a fourth path of a battery charging system according to an embodiment.

Referring to FIG. 1, a battery charging system 1 according to an embodiment includes a first battery pack 10 and a second battery pack 20.

The first battery pack 10 and the second battery pack 20 may be connected in a non-contact wireless power transmission connection (hereinafter, referred to as a non-contact connection) to supply power to each other. The non-contact connection in the present invention may be a connection using an inductive coupling method, a radiation method, a non-radiation method, a long-distance method, and the like except for a physical connection using a connector, but is not limited thereto. The first battery pack 10 and the second battery pack 20 are complementary, and one having a high voltage pack among the two battery packs (the first battery pack 10 and the second battery pack 20) may charge the other having a low voltage. In addition, the first battery pack 10 may be an auxiliary battery, and the second battery pack 20 may be a main battery, but the present invention is not limited thereto.

The first battery pack 10 includes a first communication module 11, a first battery 12, a first switch S1, a second switch S2, a first diode D1, a first capacitor C1, a first coil CL1a, a second coil CL1b, two connectors CN1, and a first battery management system (BMS) 13.

When the first battery pack 10 and the second battery pack 20 are connected in a non-contact connection, the first communication module 11 transmits and receives respective unique IDs included in the first communication module 11 and a second communication module 21 of the second battery pack 20. When a unique ID received from the second battery pack 20 and a unique ID of the first communication module 11 match, the first communication module 11 may transmit a matching signal to the first BMS 13. The first communication module 11 may transmit a change signal to the second communication module 21. The first communication module 11 may be a wireless communication module such as an NFC module or an RFID module, but is not limited thereto.

The first battery 12 includes a plurality of cells C, may be connected to a motor M (see FIG. 3A) through the two connectors CN1, and may be charged with power of the second battery 22 through a non-contact connection.

The first BMS 13 measures a voltage of the first battery 12 (hereinafter, a first voltage V1), and applies a first pulse width modulation (PWM) signal having a predetermined duty cycle to the first switch S1 according to the matching signal or the change signal to control a switching operation of the first switch S1. The first BMS 13 controls a switching operation of the second switch S2 by using a first control signal.

The first switch S1 is connected between a positive electrode of the first battery 12 and one end of the first coil CL1a, and is on/off-controlled according to the first PWM signal.

The second switch S2 is connected between a negative electrode of the first battery 12 and one end (a first end) of the second coil CL1b, and is on/off-controlled according to the first control signal.

The first diode D1 includes a cathode connected to the positive electrode of the first battery 12 and an anode connected to the other end (a second end) of the second coil CL1b.

The first capacitor C1 is connected between a first node N1 and a second node N2.

The first coil CL1a includes one end (a first end) connected to the first switch S1 and the other end (a second end) connected to the negative electrode of the first battery 12.

The second coil CL1b includes one end (a first end) connected to the second switch S2 and the other end (a second switch) connected to the anode of the first diode D1.

The second battery pack 20 includes a second communication module 21, a second battery 22, a third switch S3, a fourth switch S4, a second diode D2, a second capacitor C2, a third coil CL2a, a fourth coil CL2b, two connectors CN2, and a second BMS 23.

When the first battery pack 10 and the second battery pack 20 are connected in a non-contact connection, the second communication module 21 transmits and receives respective unique IDs included in the first communication module 11 and the second communication module 21. When a unique ID received from the first battery pack 10 and a unique ID of the second communication module 21 match, the second communication module 21 may transmit a matching signal to the second BMS 23. The second communication module 21 may be a wireless communication module, such as an NFC module or an RFID module, but is not limited thereto. The second communication module 21 may transmit a change signal to the first communication module 11.

The second battery 22 includes a plurality of cells C, may be connected to a motor M (see FIG. 2A) through the two connectors CN2, and may be charged with power of the first battery 12 through a non-contact connection.

The second BMS 23 measures a voltage of the second battery 22 (hereinafter, a second voltage V2), and applies a second pulse width modulation (PWM) signal having a predetermined duty cycle to the third switch S3 according to the matching signal or the change signal to control a switching operation of the third switch S3. The second BMS 23 controls a switching operation of the fourth switch S4 by using a second control signal. When the first voltage V1 is lower than the second voltage V2, the second BMS 23 may generate a change signal for changing a battery pack to be charged.

The third switch S3 is connected between a positive electrode of the second battery 22 and one end (a first end) of the third coil CL2a, and is on/off-controlled according to the second PWM signal.

The fourth switch S4 is connected between a negative electrode of the second battery 22 and one end (a first end) of the fourth coil CL2b, and is on/off-controlled according to the second control signal.

The second diode D1 includes a cathode connected to the positive electrode of the second battery 22 and an anode connected to the other end (a second end) of the fourth coil CL2b.

The second capacitor C2 is connected between a third node N3 and a fourth node N4.

The third coil CL2a includes one end (a first end) connected to the third switch S3 and the other end (a second end) connected to the negative electrode of the second battery 22.

The fourth coil CL2b includes one end (a first end) connected to the second switch S2 and the other end (a second end) connected to the anode of the second diode D2.

Hereinafter, a charging path of an embodiment in which the first battery pack 10 and the second battery pack 20 are connected in a non-contact connection and the second battery pack 20 is charged with the first battery pack 10 will be described with reference to FIG. 2A and FIG. 2B. FIG. 2A illustrates a first path of a battery charging system according to an embodiment. FIG. 2B illustrates a second path of a battery charging system according to an embodiment.

The first BMS 13 controls the first switch S1 to perform a switching operation, that is, an on operation and an off operation once, according to the matching signal, and controls the second switch S2 to be turned off. In this case, the second BMS 23 controls the third switch S3 to be turned off and the fourth switch S4 to be turned on. The motor M may be connected to two connectors CN2. In addition, the first coil CL1a operates as a primary coil, and the fourth coil CL2b operates as a secondary coil.

First, referring to FIG. 2A, when the first switch S1 is turned on, a current flows into the first coil CL1a through a first path Ro1 passing through the first switch S1 and the first coil CL1a.

The positive electrode of the second battery 22 is connected to the cathode of the second diode D2, and the negative electrode of the second battery 22 is connected to the anode thereof. Therefore, since a reverse voltage is applied to the second diode D2, no current flows through the second diode D2. In this case, the second capacitor C2 is charged with the second voltage V2.

Next, referring to FIG. 2B, when the first switch S1 is turned off, as no current is supplied to the first coil CL1a, counter electromotive force corresponding to the first voltage V1 is generated, and a current corresponding to the counter electromotive force flows into the fourth coil CL2b, which is a secondary coil. That is, a current corresponding to the first voltage V1 flows through a second path Rf1 passing through the fourth coil CL2b and the second diode D2. Therefore, a potential difference corresponding to a sum (V1+V2) of the first voltage V1 and the second voltage V2 is generated between the third node N3 and the fourth node N4.

The second BMS 23 measures voltages (V1+V2) of both ends of the second capacitor C2 by using a voltage between the third node N3 and the fourth node N4, and calculates the first voltage V1 by using Equation 1 below.

$$V1=(V1+V2)-V2 \qquad \text{[Equation 1]}$$

The second BMS 23 compares the calculated first voltage V1 and the second voltage V2, and when the first voltage V1 is higher than the second voltage V2, the second BMS 23 controls the first switch S1 to perform the switching operation a reference number of times (for example, 10 times).

The second BMS 23 generates a change signal such that when the first voltage V1 is lower than the second voltage V2, the first battery pack 10 is charged with the second battery pack 20 by changing the battery pack.

Hereinafter, a charging path of an embodiment in which the first battery pack 10 and the second battery pack 20 are connected in a non-contact connection and the first battery pack 10 is charged with the second battery pack 20 will be described with reference to FIG. 3A and FIG. 3B. FIG. 3A illustrates a third path of a battery charging system according to an embodiment. FIG. 3B illustrates a fourth path of a battery charging system according to an embodiment.

The first BMS 13 controls the third switch S3 to perform a switching operation, that is, an on operation and an off operation once, according to the change signal, and controls the fourth switch S4 to be turned off. In this case, the first BMS 13 controls the first switch S1 to be off and the second switch S2 to be on. The motor M may be connected to two connectors CN1. In addition, the third coil CL2a operates as a primary coil, and the second coil CL1b operates as a secondary coil.

First, referring to FIG. 3A, when the third switch S3 is turned on, a current flows into the third coil CL2a through a third path Ro2 passing through the third switch S3 and the third coil CL2a.

The positive electrode of the first battery 12 is connected to the cathode of the first diode D1, and the negative electrode of the first battery 12 is connected to the anode of the first diode D1. Therefore, since a reverse voltage is applied to the first diode D1, no current flows through the first diode D1. In this case, the first capacitor C1 is charged with the first voltage V1.

Next, referring to FIG. 3B, when the third switch S3 is turned off, as no current is supplied to the third coil CL2a, counter electromotive force corresponding to the second voltage V2 is generated, and a current corresponding to the counter electromotive force flows into the second coil CL1b, which is a secondary coil. That is, a current corresponding to the second voltage V2 flows through a fourth path Rf2 passing through the second coil CL1b and the first diode D1. Therefore, a potential difference corresponding to a sum (V1+V2) of the first voltage V1 and the second voltage V2 is generated between the first node N1 and the second node N2.

The first BMS 13 measures voltages (V1+V2) of both ends of the first capacitor C1 by using a voltage between the first node N1 and the second node N2, and calculates the first voltage V2 by using Equation 2 below.

$$V2=(V1+V2)-V1 \qquad \text{[Equation 2]}$$

The first BMS 13 compares the calculated second voltage V2 and the first voltage V1, and when the second voltage V2 is higher than the first voltage V2, the first BMS 13 controls the third switch S3 to perform the switching operation a reference number of times.

The first BMS 13 generates a change signal such that when the second voltage V2 is lower than the first voltage V1, the second battery pack 20 is charged with the first battery pack 10 by changing the battery pack.

An embodiment in which the second battery pack 20 is charged with the first battery pack 10 is described in detail with reference to FIG. 2, thus is omitted.

Therefore, when there is no information on the first voltage V1, the battery charging system 1 according to the embodiment may calculate the first voltage V1 to charge a battery having a low voltage with a battery having a higher voltage among the first battery 12 and the second battery 22, and when there is no information on the second voltage V2, it may calculate the second voltage V2 to charge a battery having a low voltage with a battery having a higher voltage among the first battery 12 and the second battery 22, thus the voltage difference between the main battery and the auxiliary battery may be minimized.

Figure 4:
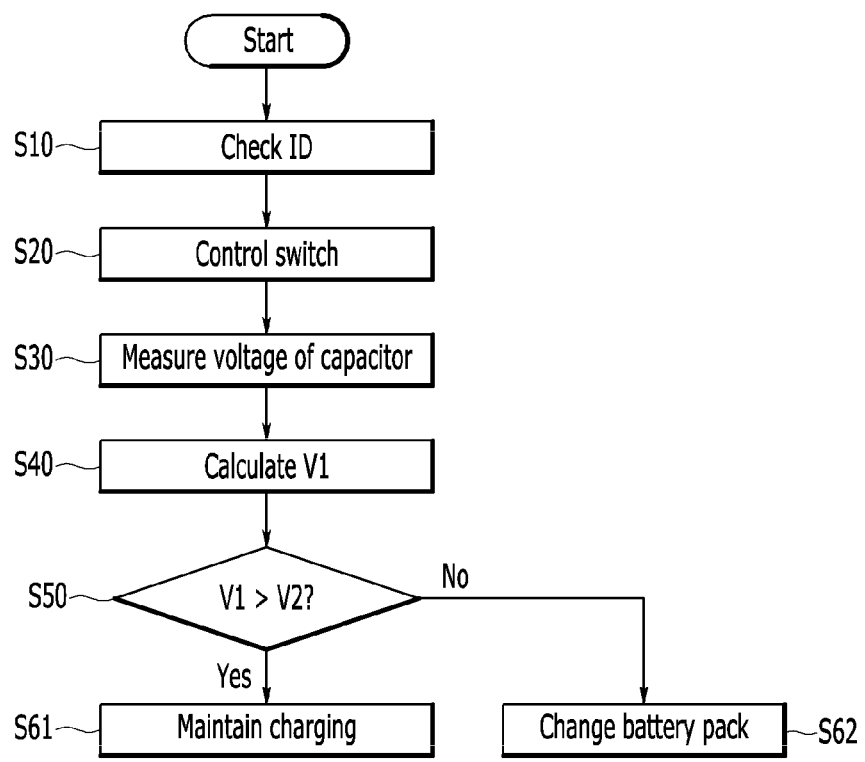
FIG. 4 illustrates a flowchart of a battery charging method according to an embodiment.

Hereinafter, a battery charging method according to an embodiment will be described with reference to FIG. 4.

At step S10, when the first battery pack 10 and the second battery pack 20 are connected in a non-contact connection, the first communication module 11 transmits and receives respective unique IDs included in the first communication module 11 and the second communication module 21, and when the unique ID of the first communication module 11 is matched, the matching signal is transmitted to the first BMS 13 to check the unique ID.

At step S20, the first BMS 13 controls the first switch S1 to perform an on operation and an off operation once, according to the matching signal, and controls the second switch S2 to be turned off. In this case, the second BMS 23 controls the third switch S3 to be turned off and the fourth switch S4 to be turned on.

At step S30, the second BMS 23 measures a voltage between the third node N3 and the fourth node N4 to measure voltages of both ends the second capacitor C2.

At step S40, the second BMS 23 calculates the first voltage V1 by Equation 1.

At step S50, the second BMS 23 compares the first voltage V1 and the second voltage V2 that are calculated by using the calculated first voltage V1. At step S61, when the voltage V1 is higher than the second voltage V2, the second BMS 23 controls the first switch S1 to perform the switching operation a reference number of times to maintain charging.

At step S62, the second BMS 23 generates a change signal such that when the first voltage V1 is lower than the second voltage V2, the first battery pack 10 is charged with the second battery pack 20 so that the battery pack is changed.

For convenience of description, it has been described that the battery charging system 1 according to the embodiment includes two battery packs, but is not limited thereto, and may include two or more battery packs.

In addition, while this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the above-detailed description is not to be interpreted as being restrictive, but is to be considered as being illustrative. The scope of the present invention is to be determined by reasonable interpretation of the claims, and all alterations within equivalences of the present invention fall within the scope of the present invention.

The invention claimed is:

1. A battery charging system, comprising:
a first battery pack; and
a second battery pack,
wherein the first battery pack includes a first battery;
wherein the second battery pack includes:
a second battery;
a first capacitor connected in series between a positive electrode and a negative electrode of the second battery; and
a first battery management system (BMS) configured to measure a voltage of the second battery and voltages of both ends of the first capacitor, wherein the first BMS is configured to:
calculate a voltage of the second battery by using the voltages of the both ends of the first capacitor,
compare the voltage of the first battery with the voltage of the second battery,
when the voltage of the first battery is higher than the voltage of the second battery, charge the second battery with the voltage of the first battery, and
when the voltage of the first battery is lower than the voltage of the second battery, charge the first battery with the voltage of the second battery and
wherein the first battery pack and the second battery pack are charged by a non-contact connection.

2. The battery charging system of claim 1, wherein the first battery pack further includes a first switch and a first coil connected in series between a positive electrode and a negative electrode of the first battery, and a second BMS configured to control the first switch to a first state or a second state,
wherein the second battery pack further includes a second coil connected in series between the positive electrode and the negative electrode of the second battery; and
wherein the first coil is a primary coil for wireless power transmission between the first battery and the second battery, and the second coil is a secondary coil for the wireless power transmission between the first battery and the second battery.

3. The battery charging system of claim 2, wherein in the first state of the first switch, a current of the first battery flows through the first coil, and
wherein in the second state of the first switch, a current corresponding to counter electromotive force of the first battery voltage flows through the second coil.

4. The battery charging system of claim 3, wherein the first capacitor is charged with the voltage of the second battery voltage in the first state of the first switch, and
wherein the first capacitor is charged with a voltage corresponding to a sum of the voltage of the first battery and the voltage of the second battery in the second state of the first switch.

5. The battery charging system of claim 4, wherein the second battery pack further includes:
a first diode connected in parallel to the first capacitor; and
a second switch connected between the negative electrode of the second battery and the second coil.

6. The battery charging system of claim 5, wherein the first battery pack further includes a second capacitor, a third coil, and a third switch that are connected in series to each other between the positive electrode and the negative electrode of the first battery;
wherein the second battery pack further includes a fourth coil and a fourth switch that are connected in series to and between the positive electrode and the negative electrode of the second battery; and
wherein the first BMS is configured to control the fourth switch to a first state or a second state.

7. The battery charging system of claim 6, wherein when the voltage of the first battery voltage is lower than the voltage of the second battery, a current of the second battery flows through the fourth coil in the first state of the fourth switch, and
wherein a current corresponding to counter electromotive force of the voltage of the second battery flows through the third coil in the second state of the fourth switch.

8. The battery charging system of claim 7, wherein the second capacitor is charged with the second battery voltage in the first state of the fourth switch, and
wherein the second capacitor is charged with a voltage corresponding to a sum of the voltage of the first battery and the voltage of the second battery in the second state of the fourth switch.

9. The battery charging system of claim 8, wherein the first battery pack further includes:
a second diode connected in parallel to the second capacitor.

10. The battery charging system of claim 9, wherein the first battery pack further includes a first communication module having a unique ID,
wherein the second battery pack further includes a second communication module wireless-communicating with the first communication module and having a unique ID, and
wherein when the first battery pack and the second battery pack are connected in the non-contact connection, the first communication module and the second communication module respectively transmit and receive the unique IDs to generate a matching signal when the unique IDs match each other.

11. The battery charging system of claim 10, wherein the first BMS controls the second switch according to the matching signal, and
wherein the second BMS controls the first switch according to the matching signal.

12. A battery charging method, comprising:
a first battery pack; and
a second battery pack,
wherein the first battery pack includes:
a first battery;
a first switch connected between a positive electrode and a negative electrode of the first battery;
a first coil connected in series between positive and negative electrodes of the first battery; and
a first communication module including a unique ID, and
wherein the second battery pack includes:
a second battery;
a first capacitor connected in series between positive and negative electrodes of the second battery; and
a second communication module having a unique ID,
wherein the first battery pack and the second battery pack are connected by a non-contact connection, and
wherein the method comprising the steps of:
generating a matching signal when the first communication module and the second communication module respectively transmit and receive the unique IDs and the unique IDs match each other;
controlling the first switch according to the matching signal;
measuring a voltage of the second battery;
calculating a sum of a voltage of the first battery and the voltage of the second battery by using voltages of both ends of the first capacitor;
calculating a voltage of the first battery by using the sum of the voltage of the first battery and the voltage of the second battery;
comparing the voltage of the first battery with the voltage of the second battery, and
when the voltage of the first battery is higher than the voltage of the second battery, controlling a switching operation of the first switch by a reference number of times.

13. The battery charging method of claim 12, wherein the second battery pack further includes:
a second coil;
a first diode connected in parallel to the first capacitor;
a second switch connected between a negative electrode of the second battery and the second coil; and
a third switch connected between a positive electrode and a negative electrode of the second battery;
wherein the first battery pack further includes:
a third coil;
a fourth switch connected between the negative electrode of the first battery and the third coil;
a second capacitor connected between the positive electrode and the negative electrode of the first battery; and
a second diode connected in parallel to the second capacitor,
wherein the controlling of the first switch according to the matching signal includes:
controlling the first switch to a first state, and
controlling the first switch to a second state.

14. The battery charging method of claim 13, further comprising,
after the controlling of the first switch to the first state:
controlling the third switch to the second state; and
controlling the fourth switch to the second state.

15. The battery charging method of claim 14, wherein the calculating of the sum of the voltage of the first battery and the voltage of the second battery
includes using the voltages of both ends the first capacitor after the controlling of the first switch to the second state.

16. The battery charging method of claim 15, wherein the calculating of the voltage of the first battery by using the sum of the voltage of the first battery and the voltage of the second battery includes calculating the voltage of the first battery by using the sum of the voltage of the first battery and the voltage of the second battery after the controlling of the first switch to the second state.

17. The battery charging method of claim 16, further comprising comparing the voltage of the first battery with the voltage of the second battery, and when the voltage of the second battery is higher than the voltage of the first battery, charging the first battery with the second battery.

* * * * *